J. W. HATCH.

Heel-Stiffener

No. 6,388. Reissued April 20, 1875.

WITNESSES.

L. H. Latimer,

Wm Pratt.

INVENTOR.

Jesse W. Hatch.

BY Crosby & Gregory ATTY'S.

THE GRAPHIC CO. PHOTO-LITH. 39 & 41 PARK PLACE, N.Y.

UNITED STATES PATENT OFFICE.

JESSE W. HATCH, OF ROCHESTER, NEW YORK.

IMPROVEMENT IN HEEL-STIFFENERS.

Specification forming part of Letters Patent No. 129,338, dated July 16, 1872; reissue No. 6,388, dated April 20, 1875; application filed March 27, 1875.

*To all whom it may concern:*

Be it known that I, JESSE W. HATCH, of Rochester, in the county of Monroe and State of New York, have invented an Improvement in Heel-Stiffeners, of which the following is a specification:

This invention consists of a heel-stiffening produced by crimping, in contradistinction to one produced by stamping in dies, or otherwise formed, as hereinafter described.

Figure 1:
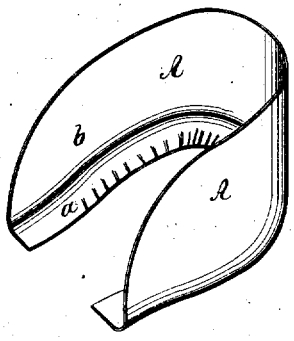
Figure 2:
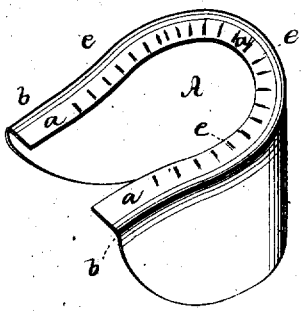

In the drawing, Figure 1 is a perspective view, and Fig. 2 a bottom view in perspective, of my improved stiffener.

A represents the stiffener, which is formed in the shape of the heel, having its lower edge turned in to form a flange, as shown at *a*, of proper form to fit between the soles. This stiffener may be made of leather or of leather-board, which is formed from sheets of leather-pulp, manila, &c., or of any fabric or material which will serve the purpose. It may also be formed of a single thickness, or of several thicknesses united, as may be desired. To crimp the stiffeners any suitable machine may be used, but I find the most effective that patented by me August 1, 1871. In that case the flat sheet, cut of proper form, is placed upon a heel-form and held stationary by a clamping-strap, while crimping-jaws come down and bend in the edges of the leather to form the flange *a*. In closing, the jaws draw in on all sides, so as to crimp and press the edges from the outside toward the center of the heel-form, or toward a line drawn longitudinally through the center of the heel-form, or inward equally toward a center at all points, whereby the round turn or seat *b* is made perfectly smooth, the crimps or gathers being thrown away from the seat *b* and to the inner edge of the flange *a*, as shown, leaving the seat *b* smooth and rounded, or completely finished and conformed to the heel-form. By turning or wiping the stiffening closely about the edge of the heel-form or support for the inner side of the stiffener, and by pressure or by the action of crimping mechanism, which forces or fits the portion to form the seat closely about the edge of the heel-form, the stiffener is made smooth and uniform, and pressure closely about the edges sets the turn or bend given to the stiffening.

Heel-stiffenings have before been formed by molding or stamping in dies. The novelty of my invention consists in crimping, in contradistinction to stamping. A perfect stiffener cannot be produced by stamping. In such case there is no drawing-in action upon the flange that is turned in, but simply a positive dead pressure of two opposing bodies, which do not work one upon another. Under such circumstances the leather is simply stamped by receiving the form of the matrix or mold, and the wrinkles or heads, which necessarily form, run back from the inner edge of the bend to the seat *b*, and render the latter irregular in form, and unfit for application without further manipulation. Indeed, the stiffener has to be hammered at the point *b* to take out the wrinkles after it has passed from the mold. To partially remedy this difficulty it has been the practice, before stamping, to cut notches in the edge of the leather to be turned in, so as to compensate for the upsetting action; but even in that case the result is unsatisfactory, as wrinkles will form. The notching, besides, greatly weakens the stiffeners of the bent edges.

In my case these difficulties are avoided, for the crimping-jaws or equivalent mechanical devices strike high upon the seat *b*, and, by moving over said parts so as to wipe the stiffener from the outside closely about the edge of the heel-form, and holding it at all times closely in contact with the edge of the heel-form, the whole of the flange is forced from the outside toward the center of the heel-form, and the material forming the stiffener is ironed over or about the edge of the heel-form, and the fullness in the stiffener caused by bending it in a curve is ironed or smoothed away from the edge, throwing the wrinkles into the inner margin of and leaving the seat *b* perfectly smooth and rounded to the form of the last or heel-form, to allow the outer leather to fit smoothly upon it, and without hammering or other manipulation. I also secure all the strength of the leather by not notching it.

This crimping action is of special service in leather-board, which is very rigid and stiff. Such material cannot be easily molded or stamped, but is readily crimped, and the stiffeners so made will retain their form for a long time. This material is of great value for stiffeners, as it is very strong, cheaply produced, and is practically water-proof, requiring from ten to twelve hours soaking before it can be used, which is not the case with leather. Heretofore such material has been formed into stiffeners by hand after having been notched and at the time of application, simply because it could not be well stamped by dies.

Another advantage of the crimping process is, that the seat *b* and the edge *a* become very hard and solid by the action of the crimping mechanism, which fits the stiffeners snugly to and forces the seat *b* closely about the edge of the heel-form, and the stiffeners will therefore retain their form much longer than if stamped, where the pressure is the same over the whole surface.

There is a great saving in the manufacture of boots and shoes by the use of these stiffeners—first, in the expense of making the stiffeners; second, in the fitting to the heel of the shoe; and, third, in the trimming, as much time is saved, owing to the perfect fit of the parts, the avoidance of hammering, and beating up the seat, and the application of a less number of tacks in attaching to the last; and, fourth, in making available female labor, in not requiring skilled labor in beating down the seat. The saving at the present time is from two to three cents per pair.

It will be seen that my improved stiffener has a smooth seat, *b*, and that the gathers or crimps extend substantially entirely about the flange, and the wrinkles or gathers do not extend about the seat, whereas, with other stiffeners heretofore made, by the action of dies or otherwise, except in my patent heretofore cited, it has been impossible to form gathers in the flange, except at and near the center of the stiffener.

Prior to my invention I am not aware that a heel-stiffener of leather or leather-board was ever made with crimps *e* distributed about the entire flange, or wherever the seat is curved, and from the back along the sides of the stiffener.

I claim—

As a new article of manufacture, a crimped heel-stiffener, substantially as described, turned inward at *b*, and bent and set to form a well-defined seat ready for lasting, and with the flange of the stiffener crimped at back and sides, or wherever the flange is not notched and the seat is curved inwardly, substantially as described.

JESSE W. HATCH.

Witnesses:
ANDREW J. HATCH,
JAMES L. HATCH.